(12) United States Patent
Bedekar et al.

(10) Patent No.: US 11,416,825 B2
(45) Date of Patent: Aug. 16, 2022

(54) MANAGED ROOMS BACKBONE

(71) Applicant: Microsoft Technology Licensing, LLC, Redmond, WA (US)

(72) Inventors: Sameer D. Bedekar, Issaquah, WA (US); Danilo Pérez Solano, Bellevue, WA (US); David C. Tse, Woodinville, WA (US); Martin D. Hall, Sammamish, WA (US); Andrew A. George, Seattle, WA (US); Jaya B. Rayasam, Redmond, WA (US); Siddhartha Roy, Sammamish, WA (US); David A. Howell, Seattle, WA (US); Irena K. Andonova, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/847,356

(22) Filed: Apr. 13, 2020

(65) Prior Publication Data

US 2021/0133689 A1 May 6, 2021

Related U.S. Application Data

(60) Provisional application No. 62/929,573, filed on Nov. 1, 2019.

(51) Int. Cl.
*G06Q 10/10* (2012.01)
*G06Q 10/06* (2012.01)
(Continued)

(52) U.S. Cl.
CPC ... *G06Q 10/1093* (2013.01); *G06Q 10/06311* (2013.01); *G06V 20/41* (2022.01); *H04L 41/0672* (2013.01); *H04L 41/0809* (2013.01)

(58) Field of Classification Search
CPC ......... G06Q 10/1093; G06Q 10/06311; G06K 9/00718; H04L 41/0672; H04L 41/0809; H04L 41/08; H04N 7/15; G06V 20/41
See application file for complete search history.

(56) References Cited

U.S. PATENT DOCUMENTS

| 5,996,094 A | 11/1999 | Ito |
| 8,601,470 B2 | 12/2013 | Yue et al. |

(Continued)

FOREIGN PATENT DOCUMENTS

WO 2014172678 A1 10/2014

OTHER PUBLICATIONS

"International Search Report and Written Opinion Issued in PCT Application No. PCT/US20/056556", dated Feb. 2, 2021, 14 Pages.
(Continued)

*Primary Examiner* — Patrice L Winder
*Assistant Examiner* — Aye M Aung
(74) *Attorney, Agent, or Firm* — International IP Law Group, PLLC (57) ABSTRACT

A system is described herein. The system includes an agent and a transmitter. The agent is to a capture room specific data signals from peripheral devices within a conference room, operating system data signals, and application data signals, wherein the application data signals are obtained from a conferencing service application and wherein the agent is to package the room specific data signals, the operating system data signals, and the application data signals with system metadata into room health data. The transmitter is to transmit the room health data to a management cloud via a communications broker.

16 Claims, 7 Drawing Sheets

(51) Int. Cl.
    *H04L 41/0806*     (2022.01)
    *H04L 41/0654*     (2022.01)
    *G06V 20/40*     (2022.01)

(56) References Cited

U.S. PATENT DOCUMENTS

| | | | |
|---|---|---|---|
| 9,294,723 | B2 | 3/2016 | Seferian et al. |
| 9,699,409 | B1 * | 7/2017 | Reshef .................. G06F 3/0484 |
| 9,904,535 | B2 | 2/2018 | Gross et al. |
| 10,044,871 | B2 | 8/2018 | Bargetzi et al. |
| 10,346,185 | B2 | 7/2019 | Beerana et al. |
| 2009/0195442 | A1 * | 8/2009 | Burri .................... G01S 7/2923 342/194 |
| 2010/0085417 | A1 | 4/2010 | Satyanarayanan et al. |
| 2010/0100965 | A1 | 4/2010 | O'Brien et al. |
| 2012/0260122 | A1 * | 10/2012 | Puri .................... H04L 12/1822 714/3 |
| 2013/0250038 | A1 * | 9/2013 | Satyanarayanan ...... H04L 41/22 348/14.11 |
| 2014/0001846 | A1 * | 1/2014 | Mosebrook ....... H02J 13/00022 307/11 |
| 2016/0080695 | A1 * | 3/2016 | Nocchi .................. H04W 4/02 348/14.09 |
| 2017/0099353 | A1 | 4/2017 | Arora et al. |
| 2018/0259543 | A1 * | 9/2018 | Gan ........................ G01N 33/72 |
| 2019/0043341 | A1 * | 2/2019 | Wouhaybi ........... H04L 63/0428 |
| 2019/0294186 | A1 * | 9/2019 | Ploegert ............. G05D 23/1917 |
| 2019/0379576 | A1 * | 12/2019 | Narnakaje Venugopala ............... H04L 41/5009 |
| 2020/0034836 | A1 * | 1/2020 | Shah ...................... G06Q 40/08 |
| 2020/0105403 | A1 | 4/2020 | Yumbe et al. |
| 2020/0348662 | A1 | 11/2020 | Cella et al. |
| 2021/0405992 | A1 | 12/2021 | Bedekar et al. |

OTHER PUBLICATIONS

"Circuit Meeting Room V1, Configuration Guide", Retrieved from https://wiki.unify.com/images/2/24/CircuitMeetingRoomV1ConfigurationGuide.pdf, Retrieved on Sep. 6, 2020, 41 Pages.

"ReadiManager Operations Guide—Polycom", Retrieved from https://knowledgebase-iframe.polycom.com/network/RMSE200_OpG_v302.pdf, Aug. 2008, 276 Pages.

"International Search Report and Written Opinion Issued in PCT Application No. PCT/US2021/030762", dated Aug. 5, 2021, 11 Pages.

"Non Final Office Action Issued in U.S. Appl. No. 17/215,164", dated Mar. 17, 2022, 15 Pages.

* cited by examiner

MANAGED ROOMS BACKBONE

BACKGROUND

Shared spaces are often equipped with dedicated audio, video, and computing equipment. For example, a shared space may be equipped with components such as audio, video, and computing equipment to enable collaboration between persons within the meeting room as well as persons located remotely from the meeting room. Equipping the shared space with the appropriate components can be challenging, as audio, video, and computing components are often not immediately compatible with other components used in the shared space. Moreover, an organization may have any number of shared spaces, each with a different size, different layout, and different component configurations. Once deployed, components of the shared space may become disabled or inoperable for a number of reasons. In the event that a component of the shared space becomes disabled or inoperable, determining the root cause of these failures may prove difficult and time consuming.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a system. The system includes an agent and a transmitter. The agent is to a capture room specific data signals from peripheral devices within a conference room, operating system data signals, and application data signals, wherein the application data signals are obtained from a conferencing service application and wherein the agent is to package the room specific data signals, the operating system data signals, and the application data signals with system metadata into room health data. The transmitter is to transmit the room health data to a management cloud via a communications broker.

Another embodiment provides an apparatus. The apparatus includes a room health monitor and a transmitter. The room health monitor is to generate a room health assessment from a room health data signal received from a shared space, wherein the room health data signal comprises room specific data signals from peripherals within the shared space, operating system data signals, application data signals, and metadata in a non-redundant configuration. The transmitter is to transmit the room health assessment to a user.

Additionally, another embodiment provides a method that enables a managed rooms backbone. The method comprises capturing room specific data signals from peripheral devices within a conference room, operating system data signals, and application data signals and combining the room specific data signals, operating system data signals, and application data signals in a non-redundant configuration to form room health data. The method also comprises transmitting the room health data to a management cloud via a communications broker.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

As discussed above, a shared space may be equipped with audio, video, and computing equipment to enable collaboration between persons within the conference room as well as persons located remotely from the conference room. An organization often has multiple shared spaces, each with different equipment and capabilities. As used herein, a shared space is a collaborative meeting area with one or more components that enable information sharing. The shared space may be, for example, a boardroom, conference room, or huddle room. Each shared space may have a distinct environment, room size, layout, and purpose. Moreover, each shared space may have a distinct infrastructure. For example, a shared space may support wired or wireless networking, have a particular number of electrical outlets, have different acoustic characteristics, and the like. As used herein, the infrastructure of a shared space includes physical characteristics of the shared space that are difficult or impossible to change. For ease of description, the present techniques may be described using a conference room as an exemplary shared space. However, the present techniques may apply to any shared space.

An organization is tasked with identifying the infrastructure of each shared space and equipping each space with audio, video, and computing equipment according to the identified infrastructure and desired capabilities of each space. Once shared spaces are equipped with these collaborative tools, the organization must monitor the equipment within in each space. Specifically, an organization must ensure that the equipment within each shared space is operable according to its intended function. Maintaining conference room equipment for multiple shared spaces is often difficult if not impossible due to each conference room having different equipment and capabilities. Each conference room may include different cables, connectors, and other interconnects. Moreover, the different equipment can have dissimilar maintenance tasks, such as specific firmware updates, differing components that require monitoring, and the like.

Furthermore, the communal nature of the shared space can lead to component failures within the space. When members of the organization are unaware of the particular configuration of components within a shared space, their use of the space may result in a changed configuration that ultimately results in failures. For example, a member may remove a cable or other connector within the shared space to accommodate another preferred cable or connector that the member wishes to use during a meeting. At the end of the meeting, the member may not return the components to their original configuration. In this event, subsequent members that use the shared space may experience failures when using the shared space due to the missing cable.

The present techniques enable a managed rooms backbone. The managed rooms backbone as described herein comprises an agent that obtains and packages room health data signals, a transmitter to transmit the packaged room health signals, and cloud services to monitor shared space health and diagnose equipment problems or issues within the shared space. In embodiments, conference room health is determined by analyzing key hardware signals, available operating system signals, and other application signals that are relevant to the conference room. In embodiments, the conference room health information may be combined and uploaded to a management cloud. The conference room health information may be collected, stored and analyzed/interpreted at the management cloud. The management cloud may employ machine learning models against telemetry including the conference room health information in order to determine likelihood of issues. The likelihood of issues may be embodied as health signals presented to a user. Accordingly, the analyzed and interpreted conference room health information may be presented to a user, and the user may be directed to take actions within the conference room to remediate conditions that negatively affect the conference room health. The user may be a member of the organization that owns the conference room. In embodiments, remediation may be done remotely by a managed room service provider. The managed room service provider may provide a conduit to the organization to remotely access devices of the organization, including each device in a shared space.

Figure 1:
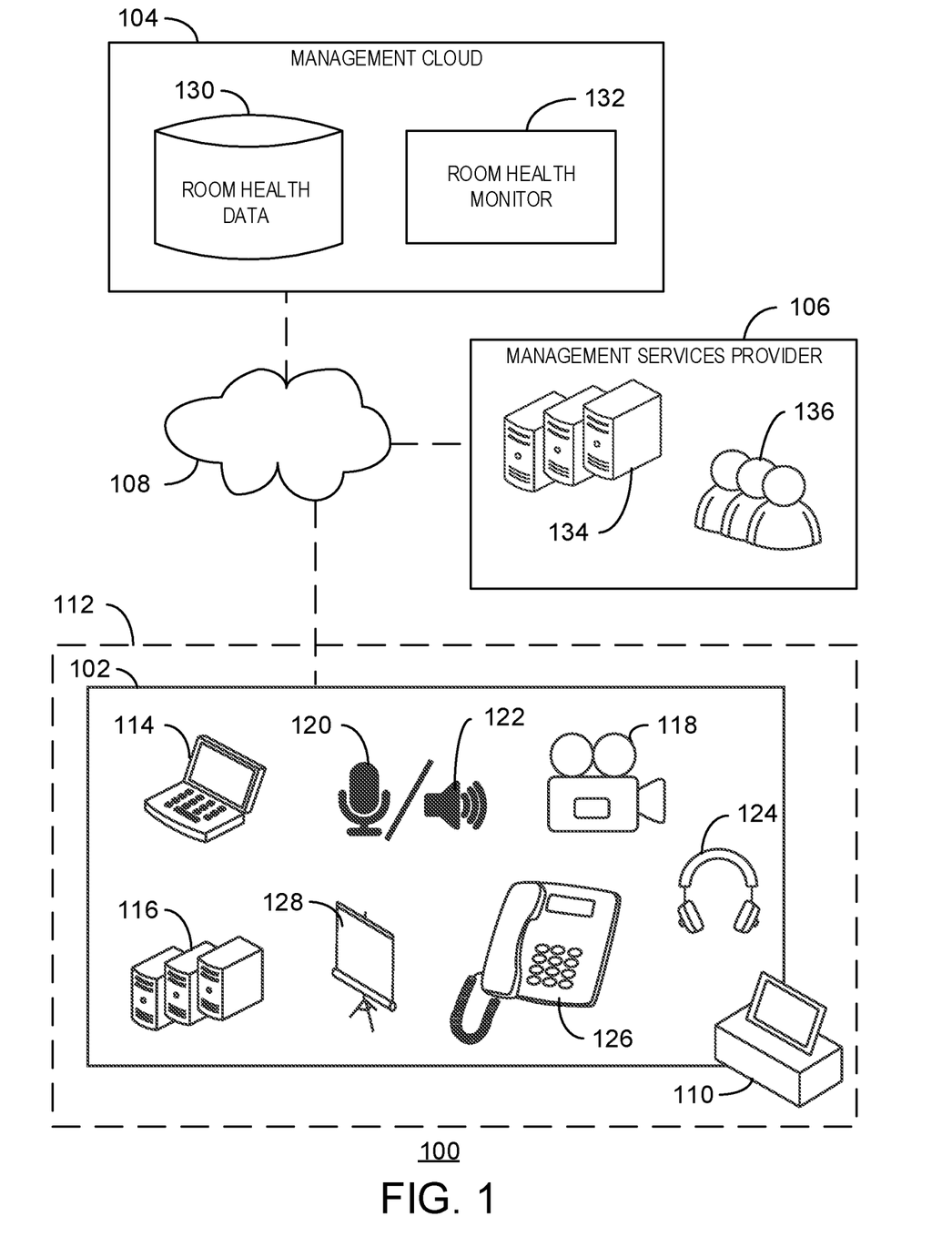
FIG. 1 is a block diagram of a networked environment including a managed rooms backbone.

As a preliminary matter, some of the figures describe concepts in the context of one or more structural components, variously referred to as functionality, modules, features, elements, or the like. The various components shown in the figures can be implemented in any manner, such as via software, hardware (e.g., discrete logic components), firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," "client," "server," and the like are intended to refer to a computer-related entity, either hardware, software (e.g., in execution), or firmware, or any combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device or media.

Computer-readable storage media can include but are not limited to magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

FIG. 1 is a block diagram of a networked environment 100 including a managed rooms backbone. In the environment 100, a managed rooms backbone 102, management cloud 104, and management services provider 106 are illustrated. Each of the managed rooms backbone 102, management cloud 104, and management services provider 106 may be communicatively coupled via a network 108. The managed rooms backbone 102 may execute via a conference room device 110. In examples, the conference room device 110 may be a hub that enables video conferencing and collaboration. In particular, the conference room device 110 can enable room scheduling, screen sharing, and video conferencing. In embodiments, the conference room device 110 is communicatively coupled with a number of peripheral devices via the managed rooms backbone 102. The conference room device may be networked according to a managed network, domain joined network, or on a zero-trust network (internet connection only).

As described herein, the managed rooms backbone 102 is a framework that interconnects peripherals and networks to achieve seamless collaboration via the peripheral functionality across one or more networks. The managed rooms backbone 102 monitors communication between the peripherals and networks. The managed rooms backbone 102 may also monitor communication with equipment/peripherals in other conference rooms. In embodiments, the managed rooms backbone 102 may function as an interface between a user and each peripheral component. For ease of description, the managed rooms backbone is described as executing on the conference room device 110. However, the managed rooms backbone may also execute via the management cloud and management services provider. In embodiments, each of the managed rooms backbone 102, management cloud 104, and management services provider 106 provides processing, analysis and feedback with respect to room health data as described herein.

For example, the managed rooms backbone 102 may execute on the conference room device 110 and monitor communications between various peripherals within a conference room 112. The conference room device 110 may be a special purpose device with custom hardware and/or software components, as well as a desktop computer, a laptop computer, a tablet computer, a smart phone, and a wearable computing device with custom components among other similar devices. The conference room device 110 may, for example, manage peripheral devices 114, 116, 118, 120, 122, 124, 126, and 128. The peripherals 114-128 may be collocated within a same conference room or shared space. The managed rooms backbone 102 along with the peripherals 114-128 enable users to share content, interact and communicate with one another, create and share calendars, and schedule meetings, among other things, through various communication modes, such as e-mail, text message, telephone, video conferencing, and the like. The conference room device 110 may monitor and manage meeting functionality as enabled by each of the peripheral devices 114-128. For example, the conference room device 110 may provide a user interface to access or initiate a meeting and manage meeting features such as audio/video controls, presentations, recordings, and the like as enabled by the peripheral devices 114-128. The conference room device 110 may communicate with the peripheral devices 114-128 via short range wireless communication such as include near field communication (NFC), Bluetooth communication, personal area network (PAN) communication, optical communication, and the like. The conference room device 110 may also communicate with the peripheral devices 114-128 via wired communications, for example, universal serial bus (USB) or similar connections.

As illustrated in FIG. 1, the peripherals devices 114-128 include computing devices such as a laptop 114 and one or more servers 116. In examples, the laptop 114 and servers 116 may enable computing functionality within a conference room or shared space that is monitored by the conference room device 110 via the managed rooms backbone 102. In embodiments, the laptop 114 and servers 116 may be shared computing devices that are associated with the particular conference room or shared space where the peripherals are located. In operation, any user within the conference room or meeting space can access the laptop 114 or servers 116 for any number of computing functions while in the conference room or shared space.

The cameras 118 enable the capture of video or images within the conference room or shared space. In embodiments, the cameras 118 may be fixtures within the conference room or shared space. In particular, the cameras 118 may be strategically placed such that all meeting spaces within the conference room or shared space can be captured. In embodiments, the cameras 118 may include pan, tilt, and zoom functionality to enhance image and video capture within the conference room or shared space. For example, each camera 118 may have a range of movement such that the conference room can be captured in its entirety. Each camera 118 may also be able to zoom in on an area, including zooming in on an individual speaker. The particular lenses and other components of the cameras 118 may be selected according to their suitability for use within a particular conference room for meeting space. For example, to capture a conference room in its entirety, a camera 118 may include a wide-angle lens.

Peripherals within a conference room or shared space also include microphones 120 and speakers 122. In embodiments, the microphones 120 and speakers 122 may be physically integrated with each camera 118. Additionally, the microphones 120 and speakers 122 may be individual components strategically placed within the conference room or shared space. In embodiments, each microphone 120 may be positioned within the conference room or shared space such that sound is captured from all locations within the shared space. Further, each speaker 122 may be positioned within the conference room or shared space such that sound is adequately provided to all locations within the conference room or shared space.

Peripheral devices also include headsets 124. The headsets 124 may be used to enable private calling or conferencing within a conference room or shared space. Accordingly, each headset may include one or more microphones and speakers. In embodiments, telephones or speakerphones 126 may be used to access telephone functionality within the conference room or shared space. Accordingly, a speakerphone 126 may include one or more microphones and speakers. In embodiments, the speakerphone 126 functionality may be integrated with the conference room device 110. In this manner, other meeting rooms and persons may be accessed from the conference room or shared space. One or more screens 128 can be used to share content or view other meeting participants. In embodiments, the screens may be a screen, display device, television monitor, computer monitor, and the like.

While particular peripherals have been illustrated as collocated in an exemplary conference room 112, any number of peripherals can be included in the conference room. Moreover, in addition to peripherals, the conference room or shared space may also include other devices and connectors such as mounting devices, cables, hubs, and other devices used to connect the peripherals to enable a seamless audio/video experience. In embodiments, the other devices may be selected to enable interoperability between peripherals. The devices of a conference room may also be used to measure the acoustics of the room and the quality of the network connection to the conference service. The room acoustics and network connection can affect the meeting experience within the conference room and can be measured and analyzed as a component of the conference room health. In embodiments, the managed rooms backbone may invoke test calls and simulate sounds via the speakers 122, headset 124, or speakerphone 126 in order to determine audio characteristics of the room, network connectivity and quality, and correctness of the configuration. The signals from the test calls and simulated sounds may be captured by microphones 120, headset 124, or speakerphone 126, and included in heuristics that determine acoustic health signals. In this manner, the different acoustic characteristics of each shared space may be determined in real time.

In embodiments, the managed rooms backbone 102 may monitor hardware signals from each peripheral device 114-128. In addition to hardware signals associated with each peripheral device, the managed rooms backbone 102 may also monitor operating system signals associated with the peripheral devices. Moreover, the managed rooms backbone 102 may capture signals from other applications executing on devices within the conference room or shared space. For example, data from other applications may include peripheral supplemental data and a telemetry heartbeat. The managed rooms backbone 102 may also query hardware signals that are specific to a particular device type. For example, application programming interfaces (APIs) from a particular hardware manufacturer may be queried to obtain a more specific error code or signal associated with the particular device. The managed from backbone 102 may combine this information and securely transmit the information across the network 108 to the management cloud 104. The combined data signals are generally referred to as room health data. In embodiments, this information may be selectively combined or packaged to reduce the transmission of redundant signals or signals that are presently irrelevant to room health.

The management cloud 104 includes a room health data store 130 and room health monitor 132. In embodiments, the room health monitor 132 may analyze the obtained room health data to determine the health of the conference room 112. As used herein, health generally refers to the fitness of the conference room for a shared, collaborative user experience. The general health of the conference room is based on, at least in part, the health of the conference room device, peripheral devices, and other devices including each connection that enables interoperability across the conference room device and peripheral devices. The room health monitor may assess a number of health indicators based on the received room health data. This assessment may be an interpretation of the health of the conference room and any devices within the conference room. For ease of description, the management cloud 104 is illustrated as communicatively coupled with a single conference room 112. However, a management cloud according to the present techniques can manage any number of shared spaces across any number of organizations. Accordingly, a managed room system according to the present techniques can use aggregate telemetry to determine broader outages and report those to the users. For example, if all devices in a particular region exhibit connectivity issues, the present technique can inform users of the managed room system that there is a network outage for an entire whole region.

In embodiments, the assessment of room health is provided to an on-site user of the conference room. As used herein, the on-site user may be located within the conference room 112 and can view the assessment of room health via the conference room device 110. In embodiments, the assessment of room health for a conference room can be viewed by a user that is a member of the organization at any location within the organization. Additionally, in embodiments users with the appropriate credentials can access room health data via an electronic device at any location. Thus, the analyzed room health data may be provided via a dashboard of the managed rooms backbone 102 that executes on the conference room device 110. The analyzed room health data may also be provided via a dashboard that executes on another device within the organization. In the event that the room health assessment indicates an issue or failure of components within the conference room, the management cloud 104 may also transmit remediation tasks or strategies to a user. In some cases, a management services provider 106 may perform remote remediations of the conference room 112. Remote remediations may be executed automatically via remediation servers 134. Remediation experts 136 may also access the room health assessment and provide remote remediations.

In embodiments, remediations may include restoring the original configuration of the peripherals in the conference room. This may include, for example, ensuring cable connections are intact. Remediations may also include peripheral-specific tasks, such as updating drivers or firmware. Other exemplary remediations include operating system remediations, such as setting power plans, lockdown policies, updating and applying operating system hotfixes and security policies, and the like. Application remediations may include comparing application configuration to a physical configuration. For example, compare a display configuration as expected by an application to the actual physical configuration visible to those in the conference room. In this example, the application may intend to project to two front of room displays but in reality, there is only one display. Remediations in this example include detecting the discrepancy in the display projection and correcting the application configuration as needed. Further, remediations may include detecting proxy configurations from the operating system and other devices, the applying the proxy configurations to devices missing such the proxy configuration and associated state.

The block diagram of FIG. 1 is exemplary and should not be viewed as limiting to the managed rooms backbone or networked environment. Note that the managed rooms backbone or networked environment can have more or fewer blocks than those illustrated in the example of FIG. 1. Moreover, some blocks may be implemented via a computing device such as the system 700 of FIG. 7. In particular, environment 100 can include fewer or additional components not illustrated in FIG. 1, such as additional instances of the managed rooms backbone, additional instances of the management services provider, additional management clouds, additional networks, and the like. The environment 100 may include any number of additional components not shown in FIG. 1, depending on the details of the specific implementation. Furthermore, any of the functionalities of the managed rooms backbone 102, the management cloud 104, and the management services provider 106 may be partially, or entirely, implemented in hardware and/or in a processor. For example, the functionality may be implemented with an application specific integrated circuit, in logic implemented in a processor, or in any other processing device.

Figure 2:
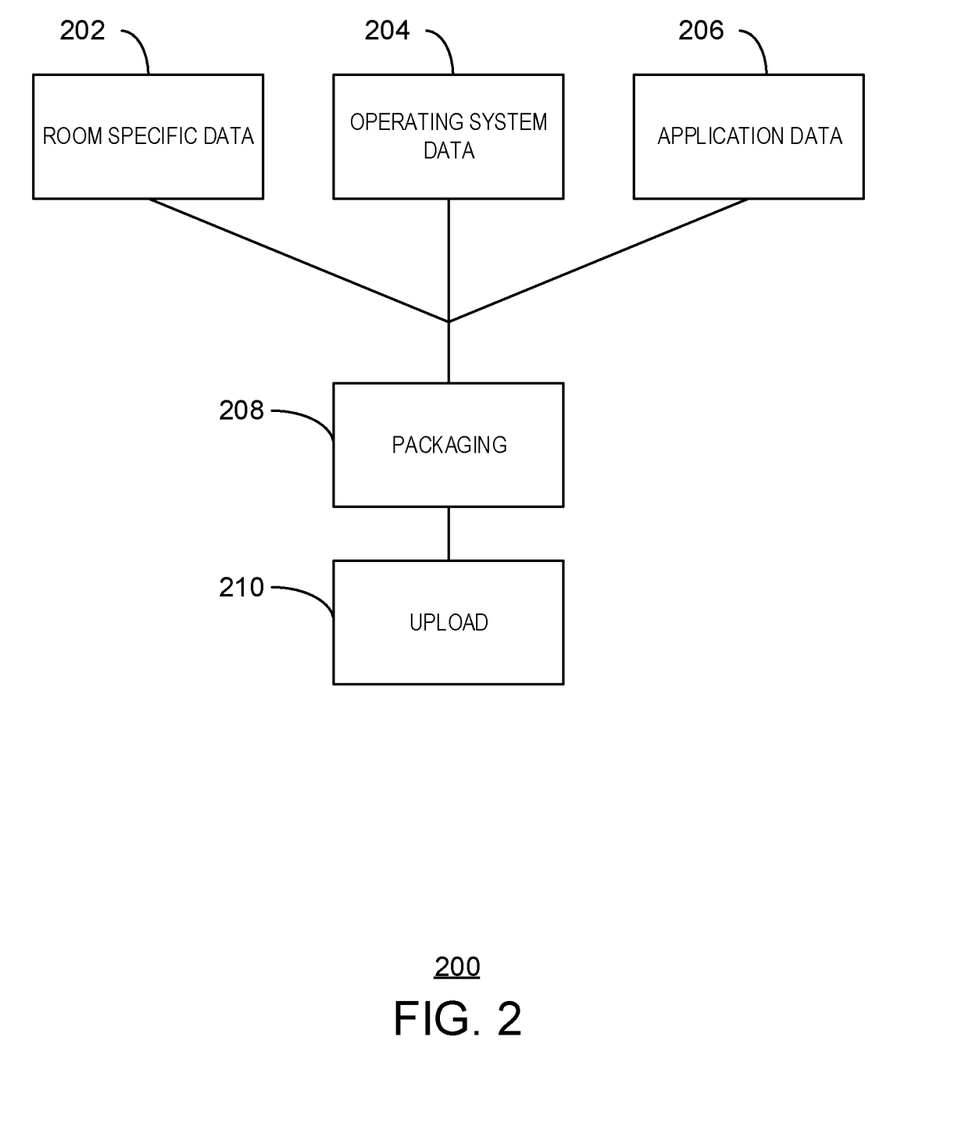
FIG. 2 is a block diagram illustrating components of room health data.

FIG. 2 is a block diagram 200 illustrating components of room health data. In embodiments, a managed rooms backbone includes an application programming interface (API) that is to capture data signals, package the data signals and metadata, and upload the packaged data to a management cloud. The API may define the variables, object classes, routines, and data structures that specify the particulars of communication between the managed rooms backbone and the management cloud. The API may be used to abstract the implementation of a particular operating system and provide access to objects or actions within the implementation in an expected and predictable manner By way of example, exemplary API functionality includes enabling access to system resources, such as a memory, file system, processes, threads, and devices. The API may also enable access to data signals as described herein.

In embodiments, the API may be a Windows API, such as Win32. Win32 is an API implemented on a 32-bit platform of a Windows-based architecture. The API may also be a Mobile Device Management (MDM) API or a Windows Management Instrumentation (WMI) API. While particular APIs are described herein, the present techniques are not limited to any particular API. Accordingly, the Win32 API is used for ease of description and should note be viewed as limiting the present techniques.

An agent may be based on the Win32 API and can access services provided by the API in a continuous and autonomous fashion. In particular, the Win32 agent may obtain information relevant to the health of peripheral devices in a conference room for further processing by a managed rooms backbone. As used herein, an agent is a software application or program that completes tasks without intervention or requests. In embodiments, the agent may automatically capture a number of signals relevant to the health of a conference room and combine or package these signals for transmission. Accordingly, at block 202 room specific data signals are illustrated. Room specific data may be obtained from a conferencing service application. The conferencing service application may derive interpretations of room health for each individual managed room. In embodiments, the conferencing service application may experience a number of events that can be signals captured by the agent as room specific data. Room specific data includes data that may indicate the presence of particular peripheral devices within a conference room. For example, the agent may obtain data that indicates that particular devices are present within the conference room. In the event that the devices expected within the conference room do not match the actual devices present in the conference room, the agent may capture this discrepancy as room specific data. In some cases, a lack of data from a conferencing service application may indicate that the conferencing service application is not presently executing. Not executing the conferencing service application can indicate a failure within the managed room. Room specific data may also include particular settings applied to the management of devices in a particular conference room. For example, settings may be applied to limit or guide the use of particular peripherals within the conference room. In embodiments, the settings may be applied by administrators of the particular conference room.

At block 204 operating system data signals are illustrated. The agent may also capture events from an operating system as operating systems data signals. In examples, the operating system may be a Windows operating system. Events as observed by the operating system include but are not limited to, a listing of all connected peripherals, USB device changes, crashes or failures, the particular installed software, running processes, and the like. The crashes or failure events may include crashes recorded in Windows Error Reporting for blue screens or driver crashes. Running processes may include all running processes, including specific processes such as antivirus processes. Moreover, the events may include the particular operating system configuration around lockdown, staying current, and managing configurations ripped or obtained from management interfaces. In embodiments, this information may be obtained by querying operating system policies. For example, a meeting room peripherals or devices may be subjected to particular policies that dictate the layout of the user interface displayed at the peripheral or device. In another example, the operating system of a peripheral may be prohibited from rendering certain menus or features. In embodiments, this may be referred to as a lockdown policy. Furthermore, in some cases the agent may be aware of the particular operating system events and capture these events as operating system data signals.

At block 206 application data signals are illustrated. The agent may also capture events from applications associated with the conference room and executing on a conference room device. The applications include, for example, a telemetry heartbeat application and a peripheral supplemental data application. A telemetry heartbeat application may enable one or more components within the particular conference room to send periodic pings or other signals to ensure the device is operable. For example, a service, server, computing device, or peripheral executing within the conference room may send a heartbeat ping to the telemetry heartbeat application to confirm that the device is operating as expected. In some cases, the telemetry heartbeat application may output a heartbeat request to each peripheral device. In the event that a peripheral device does not respond to the heartbeat request, an event can occur that is captured by the agent as an application data signal. In embodiments, the peripheral supplemental data application enables referrals to be queried through enter operable protocols and third-party APIs to determine fault codes. Additionally, application data signals include whether the application is able to sign-in to its meeting service, whether the application is able to retrieve its calendar, whether the application is running, whether the application has crashed, and other faults that the application reports in its error reporting, and the like.

At block 208, each of the room specific data signals, operating system data signals, and application data signals may be combined and packaged. In embodiments, the signals are packaged in conjunction with system metadata. System metadata may include a location, and identification of the installed operating system, agent, and other key versions. In embodiments, the operating system version, key versions, etc. are taken from the conference room device.

The packaged signals and metadata may be referred to as room health data. In embodiments, the room health data may be selectively combined or packaged to reduce the transmission of redundant signals or signals that are presently irrelevant to room to derive an enhanced aggregate signal that is representative of room health. Accordingly, the packaged signals and metadata may be packaged into a non-redundant aggregate signal that is representative of room health. For example, if the operating system reports that a peripheral is present, but the conference application reports that the peripheral is not present, then the fault may be determined to be in how the peripheral is selected and/or shared with other apps. In traditional techniques, each of the operating system report and the conference application report may be transmitted for further analysis. However, the present techniques combine this information into a single signal that representative of the discrepancy between the operating system and the conference application and transmits the aggregate signal to the management cloud for further analysis or interpretation. In an example where none of the operating system or conference device reports the peripheral as present, then it is very likely that the peripheral is physically disconnected from other conferencing equipment in the conference room. The present techniques may combine this information into a single signal that is representative of the agreement between the operating system and the conference application and transmit the aggregate signal to the management cloud for further analysis or interpretation. Thus, a room health signal according to the present techniques may be packaged such that it represents a discrepancy between room devices.

At block 210, the room health data is uploaded to a management cloud for further interpretation and analysis. In embodiments, the room health data may be communicated to the management cloud via a communications broker/bus. In embodiments, the communications broker/bus may be an Internet of Things (IoT) hub or an Azure IoT hub. In some cases, the communications broker/bus may be a cloud-hosted managed service that acts as a central message hub for bi-directional communication between the management cloud and the managed rooms backbone. As used herein, the term "communications broker/bus" is not limited to one particular type of IoT service, but refers to a device with which the managed rooms backbone communicates, for secure communication with the management cloud. Accordingly, in embodiments a conference room device may include a managed rooms backbone and a communications broker/bus. The communications broker/bus may support communications both from the managed rooms backbone to the management cloud and from the management cloud to the managed rooms backbone. The communications broker/bus as described herein supports multiple messaging patterns such as backbone-to-cloud telemetry, file upload from the managed rooms backbone, and request-reply methods to control the managed rooms backbone from the cloud. This functionality may be based on identifying the particular managed room backbone, wherein each managed room backbone instance can correspond to a particular shared space. The communications broker/bus can identify the managed rooms backbone via an identity attestation process using a trusted platform module (TPM). Additionally, the communications broker/bus can identify the managed rooms backbone via an identity attestation process using conference room account sign-in credentials. The TPM may issue a nonce challenge using the TPM standard for keys to present a signed Shared Access Signature (SAS) token in the identity attestation process. The TPM standard is the TPM2.0 Library Specification published Jun. 29, 2015. In embodiments, the IoT hub may also provide transport and storage for files.

Figure 3:
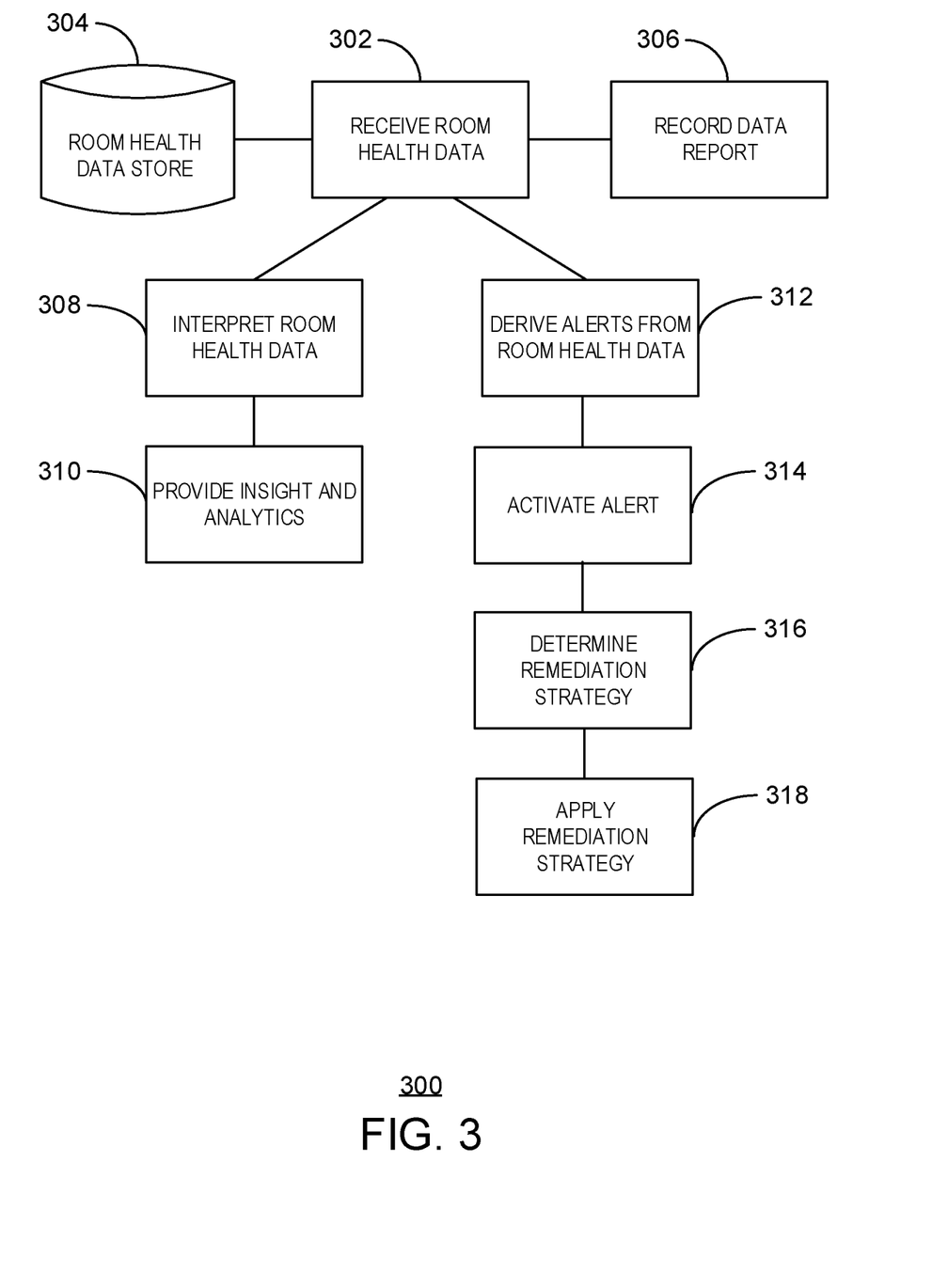
FIG. 3 is a block diagram illustrating interpretation of received room health data.

FIG. 3 is a block diagram 300 illustrating interpretation of received room health data. At block 302, room health data is received. In examples, room health data may be received by a management cloud. Room health data may be for example, a combination of room specific data signals, operating system data signals, application data signals, and metadata as captured in a conference room. The received room health data may be stored in a room health data store 304. Moreover, the room health data may be used to record a data report at block 306. The data report may include all of the captured room specific, operating system, and application data signals within a record corresponding to a user, device, room, organization, or any combination thereof. The data report may also store associated metadata such as a time of the report into a compliant data store that is partitioned by user, device, room, organization, or any combination thereof. In examples, the compliant data store may be an Azure Cosmos Database. The store can be queried for individual signals and/or aggregate reports. The records may contain other metadata such as room survey data, desired configurations of a user, device, room, organization, and the like.

Generally, room health data such as room specific data signals, operating system data signals, application data signals, and metadata as captured in a shared space can be monitored to ensure proper operation of each device in a space. In embodiments, the managed rooms backbone monitors and maintains room health data to maintain and enhance performance of devices within the shared space. For example, the managed rooms backbone ensures the correct application set is installed on devices in the shared space, and that extraneous applications are not installed. The managed rooms backbone may also perform mitigating actions, such as uninstalling software, in response to an incorrect application set detected in a shared space. The managed rooms backbone may also ensure the correct applications are running, and that extraneous applications are not running according to a usage scenario of the shared space. For example, particular applications may be expected to execute when the shared space is used to collaborate with other shared spaces. When the shared space is not in use, another set of applications may be expected to execute. The managed rooms backbone may also perform mitigating actions, such as stopping or killing applications that should not be executing in response to detecting that an application is executing that should not be executing. The managed rooms backbone may also monitor an application inventory and compare the inventory with a baseline of expected software required to keep the device operational.

Additionally, the managed rooms backbone may monitor the size of the registry and determine where it may be changing through snapshots and analysis of the snapshots. The managed rooms backbone may also monitor the performance of a hard disk drive of a device, including the fragmentation status, free space, and metrics. Metrics may include, but are not limited to, such as reads/writes per second, cache utilization, and the like. Further, the managed rooms backbone may perform mitigating actions such as deleting caches, temporary files, unneeded software, and invoking defragmentation operations on the drives. Other monitoring scenarios include monitoring an overall CPU utilization over time and monitoring the CPU utilization of executing applications. Moreover, the managed rooms backbone may be configured to monitor drivers, proxy settings, and e-CDN settings specific to intensive operations such as video rendering and audio/video streaming.

At block 308, room health data may be interpreted. Interpreting the room health data includes an analysis of the room health data in view of expected room health data values. In embodiments, the room health data may be interpreted via machine learning techniques to determine a likelihood of one or more issues. At block 310, insights and analytics are provided based on the interpreted room health data. In particular, the room health data may be graphed and aggregated into a human readable form. Trends and common failure patterns may be identified from the interpreted room health data. Patterns may be identified across any reported property expected in the conference room. For example, patterns may be identified across any reported property in the location, referral, manufacture, or class of problem. In some cases, the class of problem may be identified via a diagnostic code. The room acoustics and network connection can be measured and interpreted as a component of the conference room health. In embodiments, a room health assessment may be determined by interpreting the room health data or providing insight and analytics based on the interpreted room health data. The room health assessment may indicate a rating of the overall health or a shared space, as well as the health of peripherals, devices, and interconnects within the shared space.

Additional statistical analysis of the interpreted room health data may be enabled. For example, trends and common failure patterns may be identified according to time horizons. Specifically, any trend or pattern may be analyzed to determine outliers and anomalies within each trend or failure pattern. Moreover, each trend and failure pattern may be analyzed in view of its recurrence across time horizons. In addition to the identification of trends in common failure patterns, usage patterns within the managed conference room may be determined. Additionally, a return on investment (ROI) calculator may be used to calculate savings from remote meetings when compared to meeting with all individuals in person. Insight may also be based on a comparison of an organization's managed rooms data with the generalized managed rooms data from other organizations. For example, individual organization performance may be compared against multiple tenant metrics. Badges can be assigned to individual user/organization performance yielding a gamification of positive behaviors. The insight and analytics may be provided to a user within the organization. Based upon a review of the insight and analytics, the user can make decisions regarding the particular equipment and capabilities established in the particular conference room of the organization.

At block 312, alerts are derived from the room health data. In embodiments, an alert engine may analyze the room health data to determine if an alert should be generated. In embodiments, the alert may be activated at block 314 in response to the detection of an alert condition. In embodiments, the present techniques may analyze aggregated room health data from multiple rooms across one or more organizations. Telemetry from multiple rooms across one or more organizations is aggregated and interpreted to determine broader outages and report those to the users. For example, if all devices in a geographic region containing multiple organizations exhibit connectivity issues, the present techniques can indicate an outage for the entire region. The outage may be indicated by activating an alert.

At block 316, a remediation or remediation strategy is determined. In embodiments, the remediation or remediation strategy is a response to the activated alert. In embodiments, the particular alert and the remediation may be transmitted from the management cloud to a particular instance of managed rooms backbone of the organization. A dashboard of the managed rooms backbone may display the alert and any other associated information. Additionally, the dashboard of the managed rooms backbone may also display the remediation strategies. At block 318, the remediation strategy may be applied to the conference room. In embodiments, a user may implement one or more remediation strategies to eliminate the activated alerts. In embodiments, the managed rooms backbone may automatically implement a remediation strategy. Remediation strategies include, but are not limited to, resetting, reimaging, and rebuilding a machine to known baselines. The known baselines may be those baselines know to the managed room backbone.

To derive an alert from the received room health data, the room health data may be compared to a number of rules or requirements for the particular conference room. The room health data may also be compared to supplemental user/organization instructions, such as suppression or executive room markers, business hours, and the like. The comparison of the room health data to expected data values and supplemental organization instructions in a rules-based fashion may be included in a room health assessment of the conference room. In examples, the received operating system data signals may be compared to the expected data signals from the managed from application. In the analysis of room health data to determine an alert, a time delay may be added for noisy incident types that require multiple instances in order to activate an alert. In embodiments, the received from health data may also be compared to the user submitted roles. User roles may include suppression (where alerts are ignored, within a timeframe or always), maintenance windows, and/or may include higher alerting level definitions. Higher alerting definitions may be used against critical rooms such as executive rooms, very important person (VIP) rooms, large multi-purpose rooms, and the like. In the event that the received room health data does not satisfy the user/organization submitted roles, and alert may be derived.

The use of user submitted roles may be referred to as suppression. In an example of suppression, a user may determine that a particular room health signal is irrelevant. Consider high-end conference room with displays that consume a large amount of power. The displays may power off to save power. However, outside of typical office hours, as user may choose to suppress a room health signal that indicates that the displays are off as an alert condition. However, in an important or highly visible conference room such as a boardroom or executive room, a user may want immediate notification of a room health signal. In some cases, the user may want to know immediately of any issues, prior to deriving any analytics or determining a remediation strategy. In embodiments, a user can be provided with a notification of room health via a text or push notification based on settings or policies of the particular room.

In embodiments, the room health data may be compared to a manifest of expected values, such as expected firmware, expected installed updates, operating system versions, application versions, and basic input/output system (BIOS) versions. Accordingly, room health data may include such as expected firmware, expected installed updates, operating system versions, application versions, and basic input/output system (BIOS) versions, and the like. In the event that the received room health data does not match the manifest of expected values, an alert may be derived. Additionally, the room health data may be compared to a manifest of unexpected values against a non-baseline, such as spurious processes running or the installation software that is not part of the baseline. If any of these unexpected values are met, an alert may be derived. In addition to a comparison of values to the room health data, and an alert may be derived by querying peripherals through interoperability protocols and third-party APIs to determine fault codes.

Patterns in the health of an organization may be tracked via inferred maintenance windows or inferred wider maintenance or outages. The managed rooms backbone may be used as a detector for broader patterns, both intended or unintended, happening in the organization. Generally, the patterns as devices are added to the room enable an understanding of the overall organizational health, both planned and unplanned.

While particular scenarios for deriving an alert have been illustrated, an alert is generally determined when some anomaly or other abnormal circumstance is detected in the room health data. The present techniques are not limited to the particular comparisons as described above, as the comparisons are for exemplary purposes. When an alert condition is derived, the alert is activated. To activate an alert, a support ticket may be created as part of that alert. In embodiments, the support ticket has an affiliated parent alert. The parent alert is derived at block 312. A determination is made on if the ticket should be assigned to the organization directly or a management services provider for further investigation. In response to the activation of the alert, usage patterns and marking features may be analyzed to detect anomalies and generate a likely problem determination. The likely problem determination may be denoted with a unique diagnostic code. In embodiments, the diagnostic information and unique diagnostic code may be automatically appended into the support ticket. Data signals from the agent may be used to detect anomalies and generate the likely problem determination. The data signals may be the room health data as discussed above. Thus, the data signals are obtained from the peripherals, the operating system, and other conference devices. The data signals include, but are not limited to, a number of re-occurrences, device identifiers such as a name, USB standards such as product identification (PID) and vendor identification (VID), times of activations or deactivations—including whether during business hours or outside of business hours, parent characteristics such as whether the device is attached to another device with a different power profile (for example, a USB hub or a USB extender), and a power state of the system including displays and processors.

A user may review the room health data in a managed service portal. Often, the user may access the managed service portal in response to an incident, which is a combination of the activated alert and support ticket. Only a user within the organization can communicate with the management services provider in the context of the particular incident. Operators can then investigate and respond to remediate the issue. In embodiments, the management services provider may include operators (such as remediation experts) on standby to assist with remediations. Additionally, the operators may also proactively communicate with users of the conference room to mitigate and room health issues before they negatively affect the user experience within the conference room.

Figure 4:
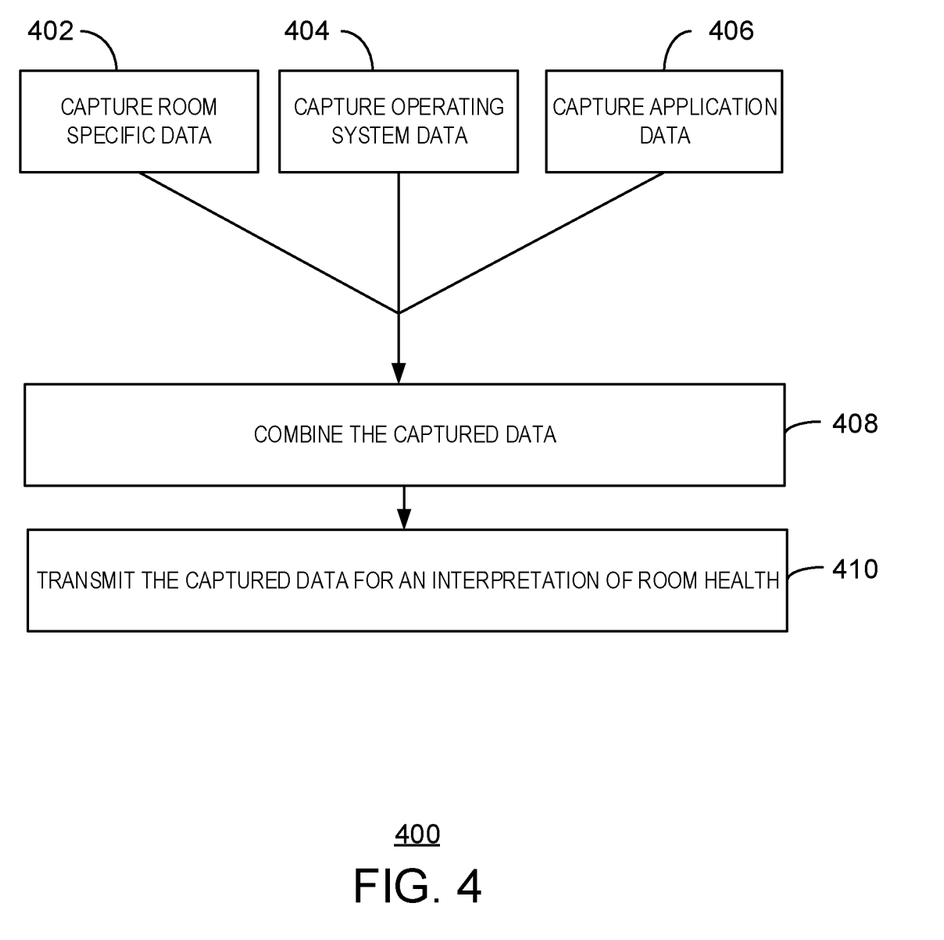
FIG. 4 is a process flow diagram of a method for a managed rooms backbone.

FIG. 4 is a process flow diagram of a method 400 that enables a managed rooms backbone. At block 402, room specific data is captured. At block 404, operating system data is captured. At block 406, application data is captured. The captured data may be captured by an agent in a continuous and autonomous fashion. For example, the agent may capture data relevant to the health of components in a conference room for further processing by a managed rooms backbone. In embodiments, the room specific data, operating data, and application data include telemetry measured for each respective data type. At block 408, the captured data is combined. In embodiments, the combined data signals are generally referred to as room health data. In embodiments, the room health data may be selectively combined or packaged to reduce the transmission of redundant signals or signals that are presently irrelevant to room health. Thus, the room specific data signals, operating system data signals, and application data signals may be packaged in a non-redundant configuration to form room health data. At block 410, the captured data is transmitted for an interpretation of room health.

Figure 5:
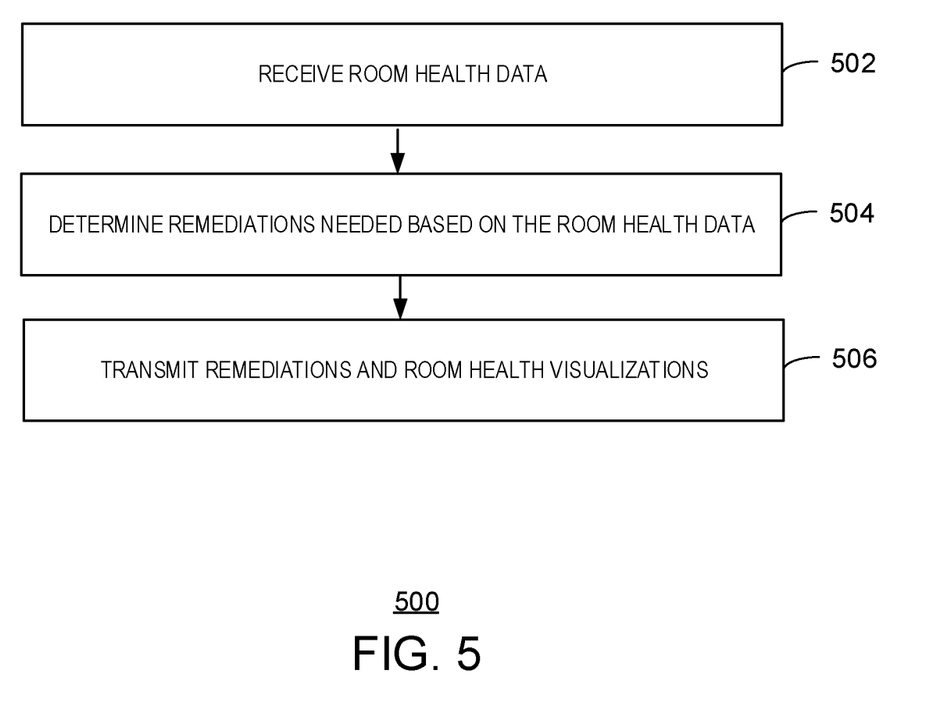
FIG. 5 is a process flow diagram of a method for determining remediations and room health visualizations.

FIG. 5 is a process flow diagram of a method 500 for determining remediations and room health visualizations. In some examples, a management cloud may be used to generate a room health assessment. In embodiments, the room health assessment may include remediations and room health visualizations. A remediation or remediation strategy may include instructions to correct an issue that has a negative impact on room health. A room health visualization may be an image, video, or diagram that communicates the current room health. At block 502, room health data is received. In embodiments, the room health data may be received at the management cloud via a communications broker/bus. At block 504, the needed remediations are determined based on the room health data. In embodiments, aggregate telemetry from devices across a plurality of rooms or organizations is analyzed and interpreted to determine broader outages. An assessment may be generated that includes the remediations. At block 506, any assessments, remediations, and room health visualizations are transmitted to a user. In embodiments, the remediations may be transmitted via a portal, electronic mail (e-mail), short message service (SMS), or any other modes of communication. For ease of description, the assessments, remediations, and room health visualizations are described as being transmitted to a user. The user can be a member of the organization that controls or owns the corresponding shared space. The user may also be a remediation expert or other professional obtained by an organization to implement or execute actions to correct any alert conditions found in the assessments, remediations, or room health visualizations. In embodiments, one or more remediations in the room health assessment are iteratively executed until an updated room health assessment is satisfactory. The room health assessment may be continuously updated in response to executed remediations. A satisfactory room health assessment may be a room health assessment in which all components are fully operable according to their expected function.

Figure 6:
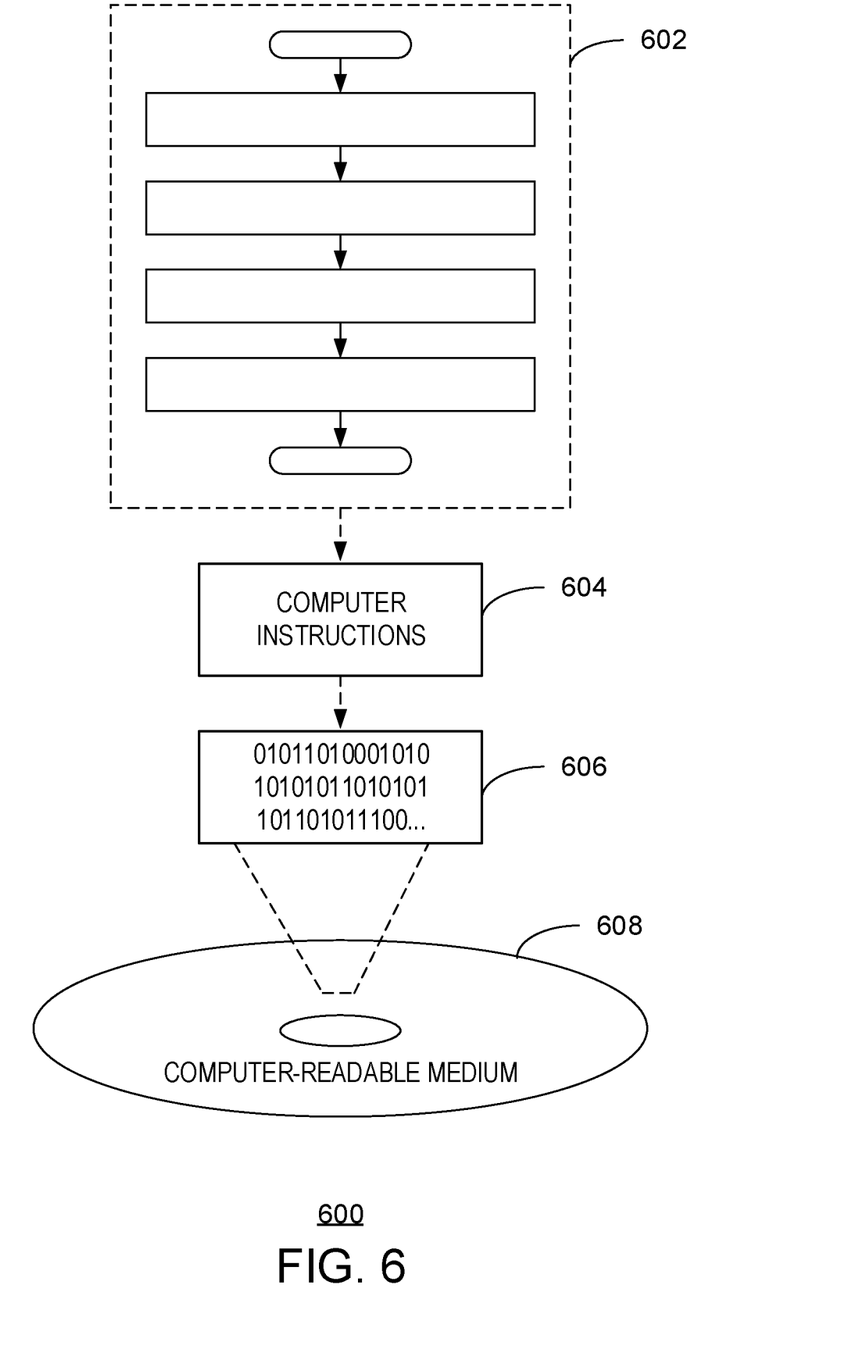
FIG. 6 is a block diagram illustrating an exemplary computer readable medium encoded with instructions for a managed rooms backbone according to aspects of the disclosed subject matter.

Turning to FIG. 6, FIG. 6 is a block diagram illustrating an exemplary computer readable medium encoded with instructions for a managed rooms backbone according to aspects of the disclosed subject matter. More particularly, the implementation 600 comprises a computer-readable medium 608 (e.g., a CD-R, DVD-R or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary method 400 of FIG. 4 or the exemplary method 500 of FIG. 5, for example. In another such embodiment, the processor-executable instructions 604 may be configured to implement a system, such as at least some of the exemplary system 700 of FIG. 7, as described below. Many such computer-readable media may be devised by those of ordinary skill in the art that are configured to operate in accordance with the techniques presented herein.

Figure 7:
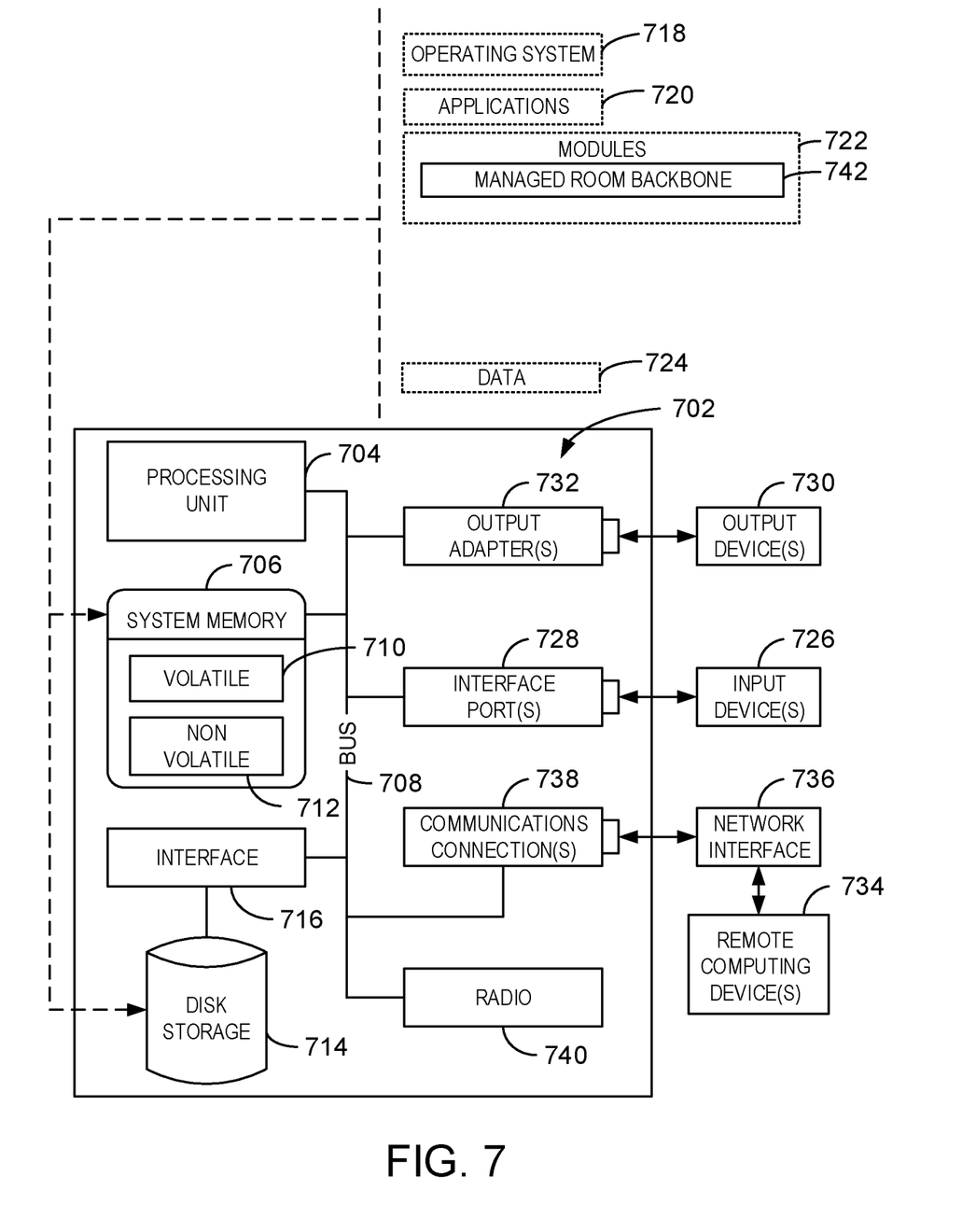
FIG. 7 is a block diagram of an example of a computing system includes a managed rooms backbone.

FIG. 7 is a block diagram of an example of a computing system includes a managed rooms backbone. The example system 700 includes a computing device 702. The computing device 702 includes a processing unit 704, a system memory 706, and a system bus 708. In some examples, the computing device 702 can be a gaming console, a personal computer (PC), an accessory console, a gaming controller, among other computing devices. Furthermore, the computing device 702 is not limited to a particular architecture. In examples, the computing architecture may be, for example, an x86 architecture, an Advanced RISC Machine (ARM) architecture, or any other computing architecture.

The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure, including the memory bus or memory controller, a peripheral bus or external bus, and a local bus using any variety of available bus architectures known to those of ordinary skill in the art. The system memory 706 includes computer-readable storage media that includes volatile memory 710 and nonvolatile memory 712.

The BIOS, containing the basic routines to transfer information between elements within the computer 702, such as during start-up, is stored in nonvolatile memory 712. By way of illustration, and not limitation, nonvolatile memory 712 can include read-only memory (ROM), programmable ROM (PROM), electrically programmable ROM (EPROM), electrically erasable programmable ROM (EEPROM), or flash memory.

Volatile memory 710 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 702 also includes other computer-readable media, such as removable/non-removable, volatile/non-volatile computer storage media. FIG. 7 shows, for example a disk storage 714. Disk storage 714 includes, but is not limited to, devices like a magnetic disk drive, floppy disk drive, tape drive, Jaz drive, Zip drive, flash memory card, or memory stick.

In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used such as interface 716.

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer 702. The operating system 718 as described herein is not limited to a particular operating system. In examples, the operating system may be, for example, a Windows-based operating system, an Android-based operating system, an iOS-based operating system, or any other operating system.

System applications 720 take advantage of the management of resources by operating system 718 through program modules 722 and program data 724 stored either in system memory 706 or on disk storage 714. It is to be appreciated that the disclosed subject matter can be implemented with various operating systems or combinations of operating systems.

A user enters commands or information into the computer 702 through input devices 726. Input devices 726 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 726 connect to the processing unit 704 through the system bus 708 via interface ports 728. Interface ports 728 include, for example, a serial port, a parallel port, a game port, and a universal serial bus (USB).

Output devices 730 use some of the same type of ports as input devices 726. Thus, for example, a USB port may be used to provide input to the computer 702 and to output information from computer 702 to an output device 730.

Output adapter 732 is provided to illustrate that there are some output devices 730 like monitors, speakers, and printers, among other output devices 730, which are accessible via adapters. The output adapters 732 include, by way of illustration and not limitation, video and sound cards that provide a means of connection between the output device 730 and the system bus 708. It can be noted that other devices and systems of devices provide both input and output capabilities such as remote computing devices 734.

The computer 702 can be a server hosting various software applications in a networked environment using logical connections to one or more remote computers, such as remote computing devices 734. The remote computing devices 734 may be client systems configured with web browsers, PC applications, mobile phone applications, and the like. The remote computing devices 734 can be a personal computer, a server, a router, a network PC, a workstation, a microprocessor-based appliance, a mobile phone, a peer device or other common network node and the like, and typically includes many or all of the elements described relative to the computer 702.

Remote computing devices 734 can be logically connected to the computer 702 through a network interface 736 and then connected via a communication connection 738, which may be wireless. Network interface 736 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 738 refers to the hardware/software employed to connect the network interface 736 to the bus 708. While communication connection 738 is shown for illustrative clarity inside computer 702, it can also be external to the computer 702. The hardware/software for connection to the network interface 736 may include, for exemplary purposes, internal and external technologies such as, mobile phone switches, modems including regular telephone grade modems, cable modems and DSL modems, ISDN adapters, and Ethernet cards.

The computer 702 can further include a radio 740. For example, the radio 740 can be a wireless local area network radio that may operate one or more wireless bands. For example, the radio 740 can operate on the industrial, scientific, and medical (ISM) radio band at 2.4 GHz or 5 GHz. In some examples, the radio 740 can operate on any suitable radio band at any radio frequency.

The computer 702 includes one or more modules 722, such as a managed rooms backbone 742. In some embodiments, the managed rooms backbone 742 enables an interconnect between peripherals and networks in a conference room of an organization. The organization may have any number of conference rooms, and each conference room can include a managed rooms backbone. In embodiments, the managed rooms backbone 742 enables seamless collaboration via the peripheral functionality across one or more networks. The managed rooms backbone monitors communication between the peripherals and networks. The managed rooms backbone may also monitor communication between other conference rooms. In embodiments, the managed rooms backbone may function as an interface between a user and each peripheral component.

It is to be understood that the block diagram of FIG. 7 is not intended to indicate that the computing system 702 is to include all of the components shown in FIG. 7. Rather, the computing system 702 can include fewer or additional components not illustrated in FIG. 7 (e.g., additional applications, additional modules, additional memory devices, additional network interfaces, etc.).

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
an agent configured to:
execute on a conference room device, wherein the conference room device is configured to communicably couple with peripheral devices within a conference room via short-range wireless or wired communication;
capture conference room specific data signals from the peripheral devices, operating system data signals associated with the peripheral devices, and application data signals obtained from a conferencing service application;
package the conference room specific data signals, the operating system data signals, and the application data signals with system metadata into room health data;
a transmitter configured to transmit the room health data to a management cloud via a communications broker: and
a receiver configured to receive a room health assessment and a corresponding remediation strategy for the conference room from the management cloud;
wherein the agent is configured to automatically implement at least a portion of the corresponding remediation strategy.

2. The system of claim 1, wherein the system further comprises the management cloud, and wherein the management cloud comprises a room health monitor configured to statistically analyze the room health data to determine the room health assessment of the conference room.

3. The system of claim 1, wherein the management cloud is configured to compare the room health data to expected data values and supplemental organization instructions in a rules-based fashion to determine the room health assessment of the conference room.

4. The system of claim 1, wherein the system further comprises the management cloud, and wherein the management cloud is configured to store the room health data in a room health data store.

5. The system of claim 1, wherein the system further comprises the management cloud, and wherein the management cloud is configured to assess the room health data via a room health monitor.

6. The system of claim 1, wherein the peripheral devices include a camera, microphone, speakerphone, speaker, headset, laptop, server or any combinations thereof.

7. The system of claim 1, wherein the conference room device is configured to be networked according to a managed network, domain joined network, or on a zero-trust network.

8. An apparatus, comprising:
a room health monitor configured to generate a room health assessment and a corresponding remediation strategy from a room health data signal received from conference room device that is configured to communicably couple with peripheral devices within a conference room via short-range wireless or wired communication, wherein the room health data signal comprises conference room specific data signals from peripheral devices within the conference room, operating system data signals associated with the peripheral devices, application data signals obtained from a conferencing service application, and metadata that are captured by an agent executing on the conference room device and packaged by the agent in a non-redundant configuration; and wherein the generated corresponding remediation strategy is designed to be executed, at least in part, by the agent; and
a transmitter configured to transmit the room health assessment and the generated corresponding remediation strategy to the conference room device on which the agent is executing.

9. The apparatus of claim 8, wherein the room health assessment comprises a room health visualization.

10. The apparatus of claim 8, wherein the corresponding remediation strategy comprises one or more remediations that are to be iteratively executed until an updated room health assessment is satisfactory.

11. The apparatus of claim 8, wherein the corresponding remediation strategy is further designed to be executed, in part, by a management services provider, and comprising transmitting the room health assessment and the corresponding remediation strategy to the management services provider, wherein the management services provider is configured to perform a remote remediation of the conference room as indicated by the room health assessment and the corresponding remediation strategy.

12. A method that enables a managed rooms backbone, comprising:
capturing, via an agent executing on a conference room device that is communicably coupled with peripheral devices within a conference room via short-range wireless or wired communication, conference room specific data signals from the peripheral devices, operating system data signals associated with the peripheral devices, and application data signals obtained from a conferencing service application;

combining the conference room specific data signals, the operating system data signals, and the application data signals in a non-redundant configuration to form room health data;

transmitting the room health data to a management cloud via a communications broker;

receiving a room health assessment and a corresponding remediation strategy for the conference room from the management cloud via the communications broker; and automatically implementing at least a portion of the corresponding remediation strategy.

13. The method of claim 12, comprising comparing, via a room health monitor of the management cloud, the room health data to expected data values and supplemental organization instructions in a rules-based fashion to determine the room health assessment of the conference room.

14. The method of claim 12, comprising comparing, via a room health monitor of the management cloud, the room health data to a user-submitted role and suppressing a room health signal of the room health data in response to the user-submitted role.

15. The method of claim 12, wherein the communications broker is a cloud-hosted managed service functions as a central message hub for bi-directional communication.

16. The method of claim 12, comprising automatically executing a second portion of the corresponding remediation strategy.

* * * * *